US007196969B1

(12) United States Patent
Karazincir

(10) Patent No.: US 7,196,969 B1
(45) Date of Patent: Mar. 27, 2007

(54) THREE-DIMENSIONAL TWO-WAY ACOUSTIC WAVE EQUATION PRE-STACK IMAGING SYSTEMS AND METHODS

(75) Inventor: Matthew H. Karazincir, Houston, TX (US)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/350,659

(22) Filed: Feb. 9, 2006

(51) Int. Cl.
*G01V 1/00* (2006.01)
(52) U.S. Cl. .......................... 367/50; 702/14
(58) Field of Classification Search .................. 702/14; 367/50
See application file for complete search history.

(56) References Cited

U.S. PATENT DOCUMENTS

| | | | |
|---|---|---|---|
| 6,687,617 B2* | 2/2004 | Kelly | 702/14 |
| 6,691,075 B1* | 2/2004 | Winbow et al. | 703/2 |
| 6,904,368 B2* | 6/2005 | Reshef et al. | 702/17 |
| 6,996,470 B2* | 2/2006 | Kamps | 702/17 |

OTHER PUBLICATIONS

Claerbout, J.F., *Fundamentals of Geophysical Data Processing*, 1976, pp. 246-256, McGraw-Hill Book Co, Inc., New York.
Dablain, M.A., "The application of high-order differencing to scalar wave equation", 1986, pp. 54-66, Geophysics, vol. 51, No. 1.
Villarreal, Alberto, Scales, John A., "Distributed three-dimensional finite-difference modeling of wave propagation in acoutsic media", 1997, pp. 388-399, Computers in Physics, American Inst. Of Phys., vol. 11, No. 4.
Baysal, Edip, Kosloff, Dan D., Sherwood, John W.C., "Reverse time migration", 1983, pp. 1514-1524, Geophysics, vol. 48, No. 11.
Chang, Wen-Fong, McMechan, George A., "Reverse-time migration of offset vertical seismic profiling data using the excitation-time imaging condition", 1986, pp. 67-84, Geophysics, vol. 51, No. 1.
Kosloff, Dan D., Baysal Edip, "Forward modeling by a Fourier method", 1982, pp. 1402-1412, Geophysics, vol. 47, No. 10.
Kosloff, D.D., Baysal E., "Migration with the full acoustic wave equation", 1983, pp. 677-687, Geophysics, vol. 48, No. 6.
Loewenthal, D., Mufti, I.R., (short note) "Reversed-time migration in spatial frequency domain", 1983, pp. 627-635, Geophysics, vol. 48, No. 5.

* cited by examiner

*Primary Examiner*—Mark Hellner
(74) *Attorney, Agent, or Firm*—E. Eugene Thigpen

(57) ABSTRACT

A system and method for pre-stack imaging system that includes multiple processors, with each processor configured to perform two-way wave equation-based forward wave propagation of a source event to obtain a source wave field using high order spatial finite differences for a shot gather, and to perform two-way wave equation-based backward wave propagation of received waves to obtain a receiver wave field using high order spatial finite differences for the shot gather; and to correlate the source and receiver wave fields to obtain an image region.

19 Claims, 4 Drawing Sheets

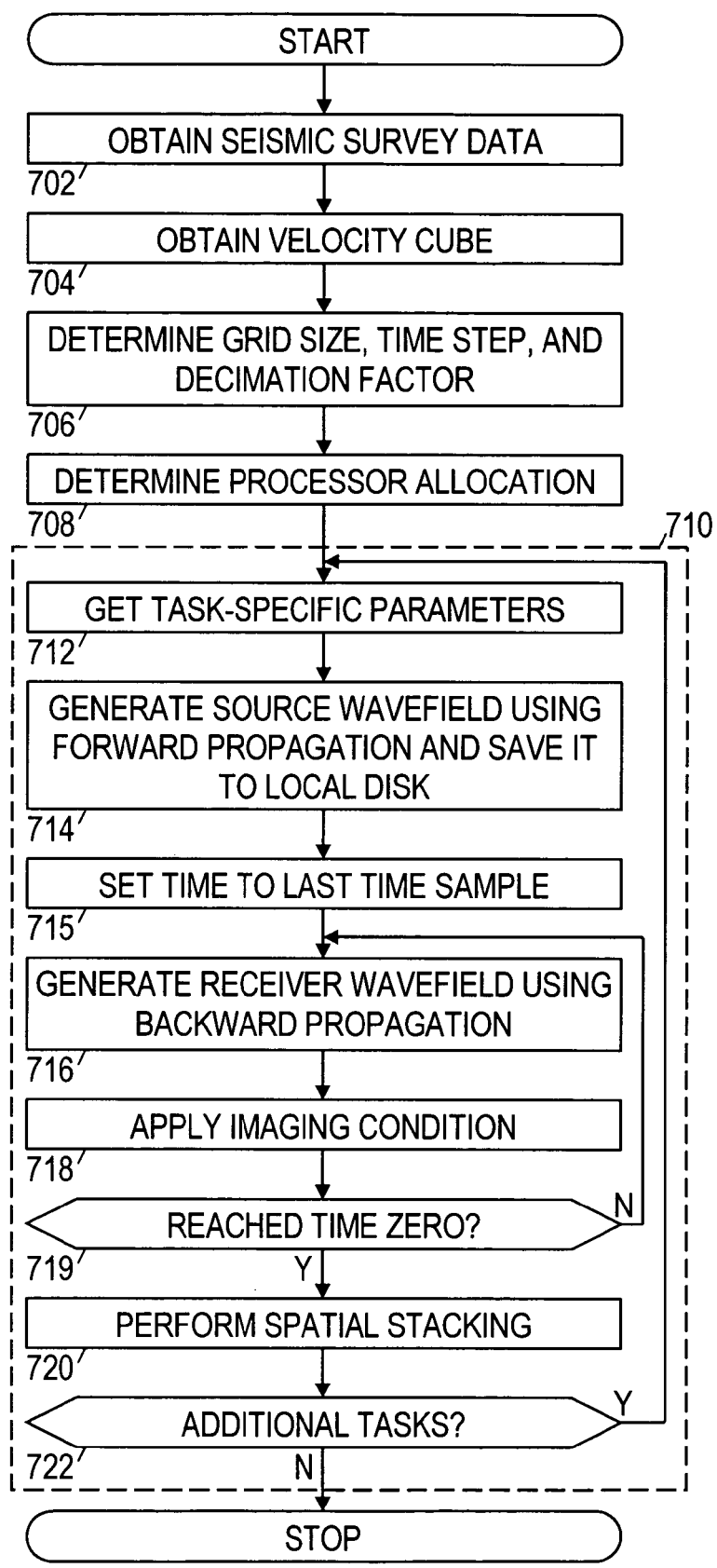

THREE-DIMENSIONAL TWO-WAY ACOUSTIC WAVE EQUATION PRE-STACK IMAGING SYSTEMS AND METHODS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

In seismic exploration, seismic data are acquired by imparting acoustic energy into the earth near its surface, and detecting acoustic energy that is reflected from boundaries between different layers of subsurface earth formations. Acoustic energy is reflected when there is a difference in acoustic impedance between layers disposed on opposite sides of a boundary. Signals representing the detected acoustic energy are interpreted to infer structures of and composition of the subsurface earth structures.

In marine seismic exploration, (seismic exploration conducted in a body of water) a seismic energy source, such as an air gun, or air gun array, is typically used to impart the acoustic energy into the earth. The air gun or air gun array is actuated at a selected depth in the water, typically while the air gun or air gun array is towed by a seismic survey vessel. The same or a different seismic survey vessel also tows one or more seismic sensor cables, called "streamers", in the water. Generally the streamer extends behind the vessel along the direction in which the streamer is towed. Typically, a streamer includes a plurality of pressure sensors, usually hydrophones, disposed on the cable at spaced apart, known positions along the cable. Hydrophones are sensors that generate an optical or electrical signal corresponding to the pressure of the water or the time gradient (dp/dt) of the pressure in the water. The vessel that tows the one or more streamers typically includes recording equipment to make a record, indexed with respect to time, of the signals generated by the hydrophones in response to the detected acoustic energy. The record of signals is processed, as previously explained, to infer structures of and compositions of the earth formations below the locations at which the seismic survey is performed. The invention described herein is an improved method for processing data, and more specifically an improved method for depth migration of seismic data.

BRIEF DESCRIPTION OF THE DRAWINGS

A better understanding of the various disclosed embodiments can be obtained when the following detailed description is considered in conjunction with the following drawings, in which:

FIG. 7 shows a flowchart for an illustrative imaging method.

Figure 1:
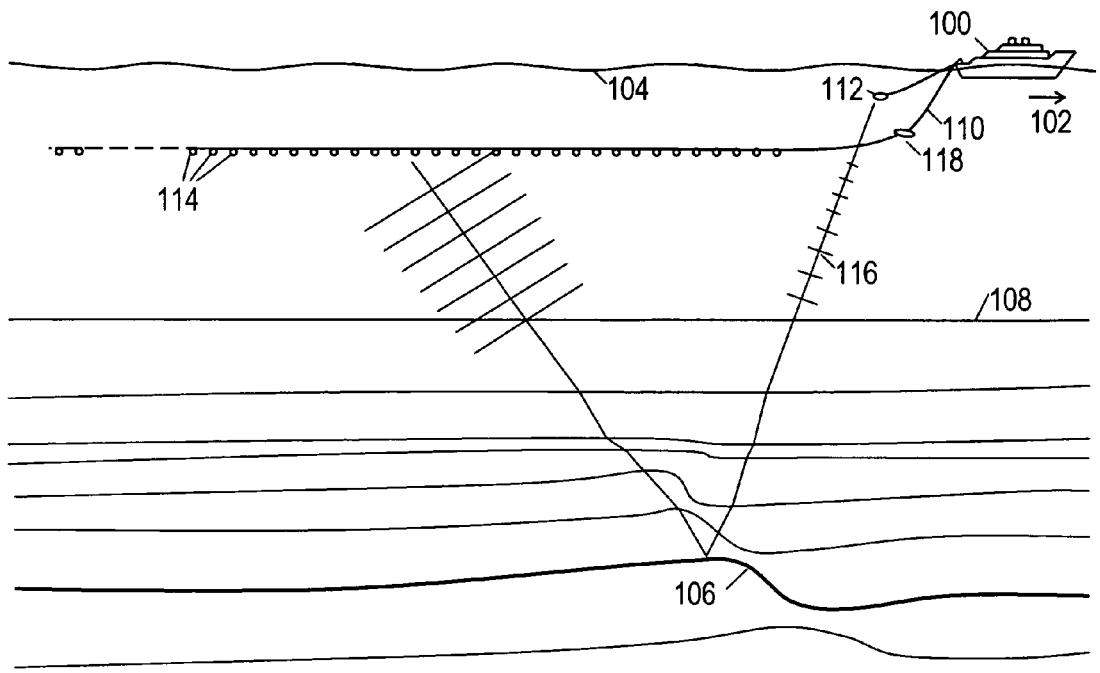
FIG. 1 shows an illustrative marine seismic survey environment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims.

DETAILED DESCRIPTION

Described herein below is a system for deriving image information from pre-stack seismic common shot gathers. Two-way acoustic wave equations are applied using high order spatial finite differences to create wave fields that propagate forward in time from the source locations and backward in time from the receiver locations. Imaging criteria are applied to the source and receiver wave fields to obtain partial images that are spatially summed to obtain a final image. Some embodiments of the invention employ maximal time stepping of the acoustic wave equations and time decimation to speed computation and reduce storage requirements, and an efficient task allocation strategy to parallelize the computation among multiple processors.

Seismic exploration is routinely performed both on land and at sea. At sea, seismic survey ships deploy streamers behind the ship as shown in FIG. 1. Each streamer 110 trails behind the ship 100 as the ship moves forward (in the direction of arrow 102), and each streamer includes multiple receivers 114. Each streamer 110 may further include a programmable diverter 118 and programmable depth controllers that pull the streamer out to an operating offset distance from the ship's path and down to an operating depth.

Streamers 110 may be up to several miles long, and are usually constructed in sections 25 to 100 meters in length that include groups of up to 35 or more receivers. Each streamer 110 includes electrical or fiber-optic cabling for interconnecting receivers 114 and the seismic equipment on ship 100. Data is digitized near the receivers 114 and transmitted to the ship 100 through the cabling, typically at rates of 7 (or more) million bits of data per second.

As shown in FIG. 1, seismic survey ship 100 also tows a source 112. Source 112 may be an impulse source or a vibratory source. The receivers 114 used in marine seismology are commonly referred to as hydrophones, and are usually constructed using a piezoelectric transducer. Various suitable types of hydrophones are available such as disk hydrophones and cylindrical hydrophones. Equipment aboard the ship controls the operation of the source and receivers and records the acquired data.

Seismic surveys provide data for estimating the location of subsurface structures such as structure 106, which lie below the ocean floor 108. By estimating various distances to a subsurface structure, the geometry or topography of the structure can be determined. Certain amplitudes and other attributes of recorded seismic data are indicative of the presence of oil and/or gas reservoirs.

To determine a distance to subsurface structure 106, source 112 emits seismic waves 116 which reflect off subsurface structure 106 (and other subsurface structures). The reflected waves are sensed by receivers 114. By determining the travel time for the seismic waves 116 to travel from source 112 to subsurface structure 106 to receivers 114, an estimate of the distance to subsurface structure 106 can be obtained.

Figure 2:
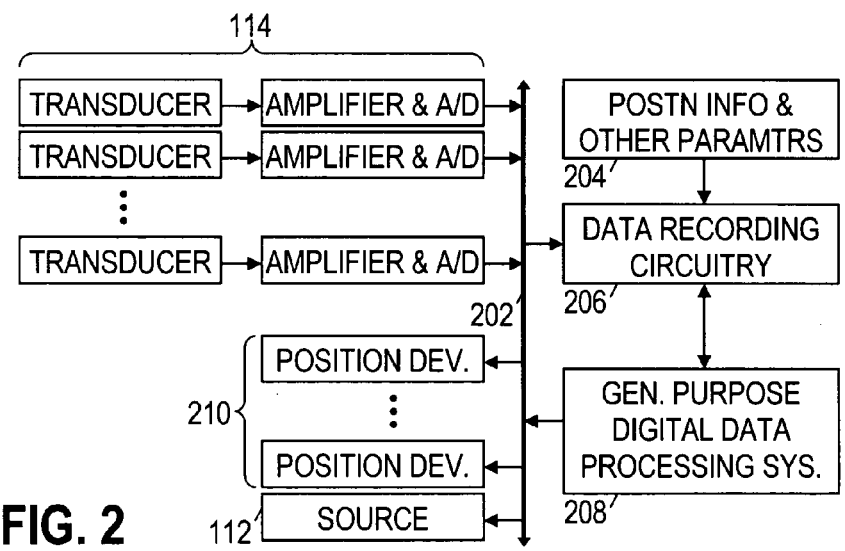
FIG. 2 shows an illustrative seismic survey recording system.

FIG. 2 shows an illustrative seismic survey recording system having the receivers 114 coupled to a bus 202 to communicate digital signals to data recording circuitry 206 on survey ship 100. Position information and other parameter sensors 204 are also coupled to the data recording circuitry 206 to enable the data recording circuitry to store additional information, such as array orientation information useful for interpreting the recorded data.

A general purpose digital data processing system 208 is shown coupled to the data recording circuitry 206, and is further shown coupled via bus 202 to positioning devices 210 and seismic source 112. Processing system 208 configures the operation of recording circuitry 206, positioning devices 210, and seismic source 112. Recording circuitry 206 acquires the high speed data stream(s) from receivers 114 onto a nonvolatile storage medium such as a storage array of optical or magnetic disks. Positioning devices 210 (including programmable diverters and depth controllers) control the position of receivers 114 and/or source 112.

The seismic recording system of FIG. 2 may include additional components not specifically shown here. For example, processing system 208 may include a user interface having a graphical display and a keyboard or other method of accepting user input. Each streamer 110 may have an independent bus 202 for coupling to the data recording circuitry. Processing system 208 may further include a network interface for communicating stored seismic survey data to a central computing facility having powerful computing resources for processing the seismic survey data.

Figure 3:
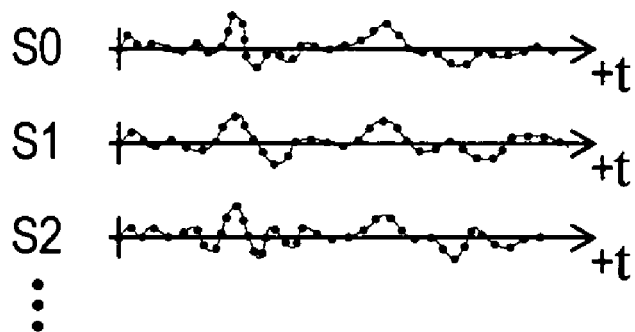
FIG. 3 shows an illustrative set of recorded signals.

FIG. 3 shows illustrative seismic signals detected and sampled by receivers 114. The signals indicate some measure of seismic wave energy as a function of time (e.g., displacement, velocity, acceleration, pressure), and they are digitized at high resolution (e.g., 24 bits) at a programmable sampling rate. Such signals can be grouped in different ways, and when so grouped, they are called a "gather". For example, a "shot gather" is the group of signals recorded for a single firing of the seismic source.

The recorded seismic survey data is of little use when maintained in the format of FIG. 3. Although it is possible to plot the various recorded waveforms side by side in a plot that reveals large scale subsurface structures, such structures are distorted and finer structures cannot even be seen. Extensions of this technique to three dimensions are difficult to use. A preferred data format is illustrated in FIG. 4.

Figure 4:
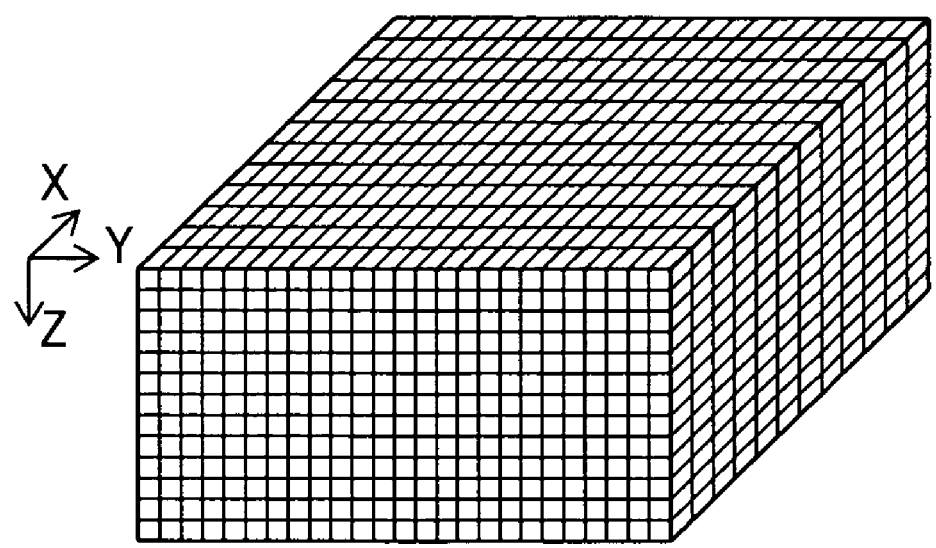
FIG. 4 shows an illustrative data volume in three dimensions.

FIG. 4 shows a "data cube", i.e., a three-dimensional array of data values. (Despite the use of the term "cube", the dimensions of the data cube do not have to be equal.) The data cube represents some seismic attribute throughout the survey region. The three-dimensional array comprises uniformly-sized cells, each cell having a data value representing the seismic attribute for that cell. Various seismic attributes may be represented, and in some embodiments, each cell has multiple data values to represent multiple seismic attributes. Examples of suitable seismic attributes include reflectivity, acoustic impedance, acoustic velocity, and density. The data cube format more readily lends itself to computational analysis and visual rendering, and for this reason, the data cube may be termed a "three-dimensional image" of the survey region.

Figure 5:
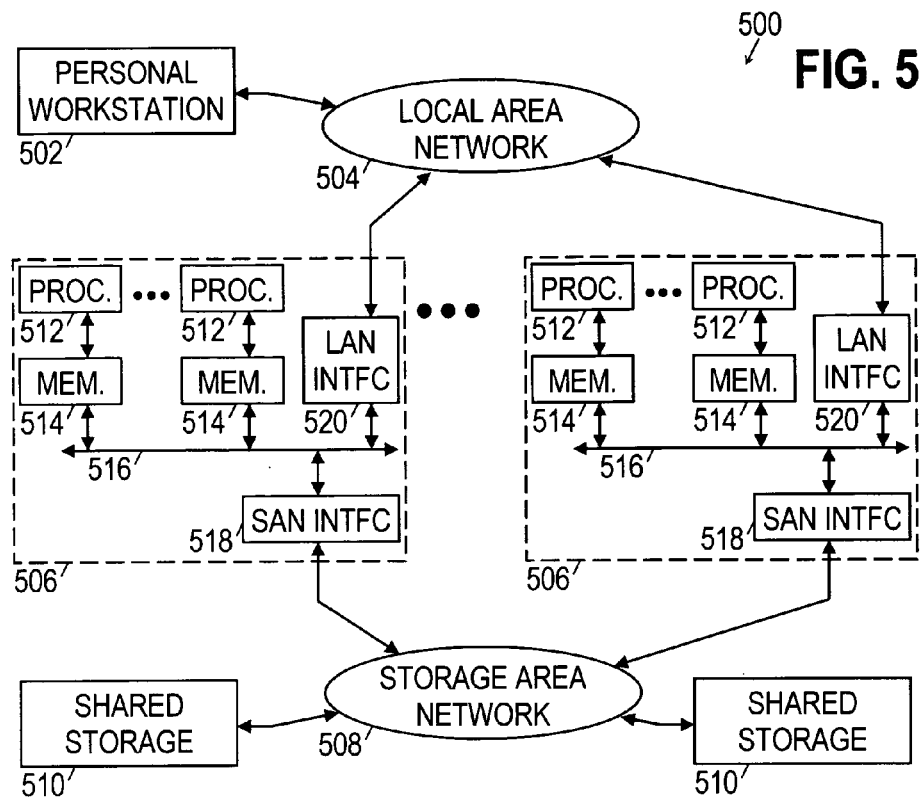
FIG. 5 shows an illustrative imaging system.

FIG. 5 shows a processing system 500 for converting stored receiver signals into a three-dimensional image of the survey region. A personal workstation 502 is coupled via a local area network (LAN) 504 to one or more multi-processor computers 506, which are in turn coupled via a storage area network (SAN) 508 to one or more shared storage units 510. Personal workstation 502 serves as a user interface to the processing system, enabling a user to load survey data into the system, to retrieve image data from the system, and to configure and monitor the operation of the processing system. Personal workstation 502 may take the form of a desktop computer with a graphical display that graphically shows survey data and 3D images of the survey region, and with a keyboard that enables the user to move files and execute processing software.

LAN 504 provides high-speed communication between multi-processor computers 506 and with personal workstation 502. The LAN 504 may take the form of an Ethernet network.

Multi-processor computer(s) 506 provide parallel processing capability to enable suitably prompt conversion of seismic receiver signals into a survey region image. Each computer 506 includes multiple processors 512, distributed memory 514, an internal bus 516, a SAN interface 518, and a LAN interface 520. Each processor 512 operates on an allocated portion of the input data to produce a partial image of the seismic survey region. Associated with each processor 512 is a distributed memory module 514 that stores conversion software and a working data set for the processor's use. Internal bus 516 provides inter-processor communication and communication to the SAN or LAN networks via the corresponding interfaces 518, 520. Communication between processors in different computers 506 can be provided by LAN 504.

SAN 508 provides high-speed access to shared storage devices 510. The SAN 508 may take the form of a Fibrechannel or Infiniband network. Shared storage units 510 may be large, stand-alone information storage units that employ magnetic disk media for nonvolatile data storage. To improve data access speed and reliability, the shared storage units 510 may be configured as a redundant disk array.

Figure 6:
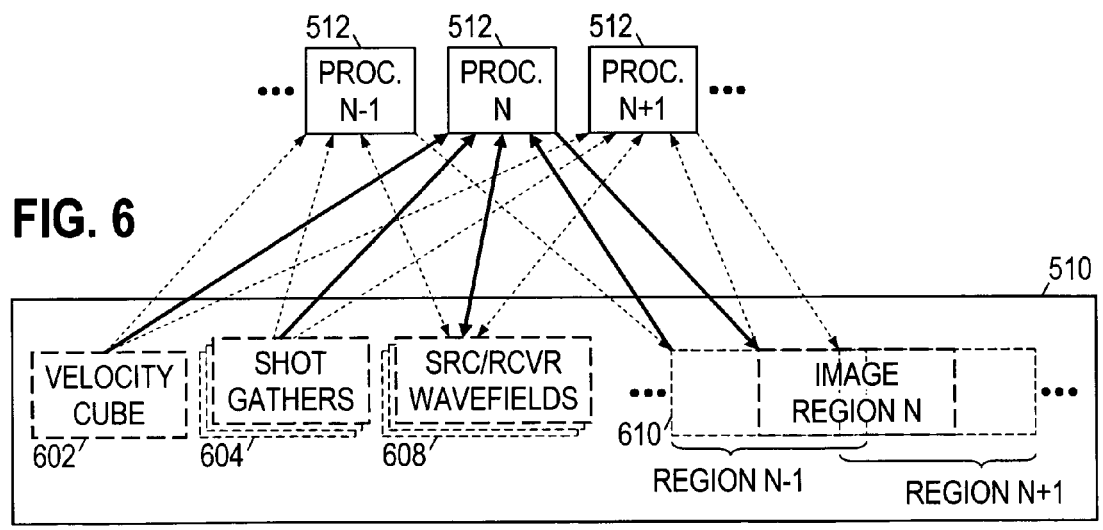
FIG. 6 shows a data flow for an illustrative imaging method.

FIG. 6 shows a data flow for some conversion process embodiments that may be implemented by processing system 500. Shared storage units 510 initially store a velocity cube 602 and shot gathers 604. Shot gathers 604 are groups of stored received signals from the seismic survey. Velocity cube 602 is a data cube of acoustic velocities, and it may be derived from shot gathers 604 using known techniques. See, e.g., Jon F. Claerbout, *Fundamentals of Geophysical Data Processing*, p. 246–56, which is hereby incorporated herein by reference.

Each processor 512 retrieves one of the shot gathers and the velocity cube from shared storage units 510. Beginning with a source position and a measured or modeled source waveform, each processor 512 forward-propagates the source waveform to create a source wave field 608 as a function of time. The source wave field 608 at uniformly spaced time intervals may be saved in storage units 510. Then, beginning with the receiver positions and the received wave signals, each processor 512 backward-propagates the received waveforms to create a receiver wave field 608 as a function of time. At most, each processor 512 may be expected to save receiver wave fields in a sliding time window. As the receiver wave fields 608 are created, they can be combined with a corresponding source wave field using an imaging criterion to create a partial image. Each processor 512 combines the partial images to build up an image region 610, and overlapping image regions are spatially summed to build up a complete image of the survey region, which is stored in shared storage units 510.

FIG. 7 shows a flowchart of illustrative conversion method embodiments. Beginning in block 702, the processing system 500 obtains seismic survey data. The survey data comprises recorded receiver waveforms, which may be corrected for individual receiver variations, but are otherwise raw, un-migrated, pre-stack data. If the data is not already organized into shot gathers 604, system 500 may perform such a data grouping.

In block 704, the processing system 500 obtains a velocity data cube 602 that has been previously determined elsewhere using methods known to those of ordinary skill in the art. In block 706, the processing system 500 determines the spatial grid size, time step, and storage decimation factor. Each of these values may be provided as an input parameter by a user, or calculated by the processing system in accordance with the following equations. The spatial grid size is the limit on the cell dimensions $\Delta x$, $\Delta y$, $\Delta z$, in the wave field data cube. It is calculated as:

$$\max(\Delta x, \Delta y, \Delta z) = c_{min}/(\alpha f_{max}) \qquad (1)$$

where $c_{min}$ is the minimum acoustic velocity in the image space, $f_{max}$ is the maximum frequency of the source wavelet (or in the input data), and $\alpha$ is the number of samples per wavelength for the maximum frequency wave. The number of samples per $f_{max}$ wavelength, $\alpha$, is a function of the approximation order for the wave propagation equation that processing system 500 is configured to use. For a $2^{nd}$ order spatial difference approximation, $\alpha$ should be 10. For $4^{th}$ order, $\alpha$ is 4, and for higher order spatial difference approximations, 3 is a sufficient value for $\alpha$. (See M. A. Dablain, "The application of high-order differencing to scalar wave equations", GEOPHYSICS, Soc. Of Expl. Geophys., v.51, p. 54–66, 1986).

The simulation time step $\Delta t$ limit can then be determined as:

$$\Delta t \leq \mu \max(\Delta x, \Delta y, \Delta z)/c_{max} \qquad (2)$$

where $c_{min}$ is the maximum acoustic velocity in the image space, and $\mu$ is a time-step factor that depends on the spatial differencing filter. The time-step factor can be determined as:

$$\mu = \frac{2}{\sqrt{\sum_{p=-\frac{n}{2}}^{\frac{n}{2}} (|w_p^x| + |w_p^y| + |w_p^z|)}}, \qquad (3)$$

where n is the order of the spatial differencing filter, and $w_p^x$, $w_p^y$, $w_p^z$ are the spatial filter coefficients in the x-, y-, and z-directions. (The spatial filter coefficients are discussed further below.)

Having determined a simulation time step $\Delta t$, the processing system 500 then determines a storage decimation factor (perhaps retrieving it as a user-specified parameter). To reduce storage requirements and expedite computations, the processing system does not save every time step of the source wave field. Rather, every $k^{th}$ time step (e.g., every $10^{th}$ step) is stored to disk. In some alternative embodiments, spatial decimation or source wave field compression may also be employed to further reduce storage requirements.

In block 708, the processing system 500 determines processor task allocations. In some embodiments, each shot gather is allocated to a corresponding processor, with each processor possibly operating on multiple shot gathers. In other embodiments, wave propagation for a given shot gather is partitioned among multiple processors, which exchange information as needed to complete the source and receiver wave fields using domain decomposition methods. (See A. Villarreal and J. A. Scales, "Distributed three dimensional finite-difference modeling of wave propagation in acoustic media", COMPUTERS IN PHYSICS, American Inst. of Physics, v.11, p. 388–99, 1997.)

Block 710 delineates computations that multiple processors may execute in parallel. Each processor performs operations represented by blocks 712–722 for each of its assigned task. In block 712, each processor 512 gets task-specific parameters. For example, when the processing for each shot gather is allocated to a single processor, block 712 represents the retrieval of the shot gather data, including the source position and receiver positions, from which the position and dimensions of the simulated area may be determined. If each processor processes only a portion of the wave field associated with a given shot gather, each processor additionally determines which portion to process and the other processors operating on that shot gather.

In block 714, each processor 512 generates a source wave field as a function of time using forward propagation. The acoustic wave equation is given by:

$$\frac{1}{c^2}\frac{\partial^2 u}{\partial t^2} = \nabla^2 u + s = \frac{\partial^2 u}{\partial x^2} + \frac{\partial^2 u}{\partial y^2} + \frac{\partial^2 u}{\partial z^2} + s, \qquad (4)$$

where $u=u(x,y,z,t)$ is the pressure field, $c=c(x,y,z)$ is the velocity field given by the velocity cube, and $s=s(x,y,z,t)$ represents the excitation signal from the seismic source. The Laplacian, $\nabla^2 u$, can be approximated to the $n^{th}$ order (n is an even integer) on a rectangular grid as:

$$(\nabla^2 u_{x,y,z}^t)^n = \sum_{l=-n/2}^{n/2} w_l \left( \frac{u_{x+l,y,z}^t}{\Delta x^2} + \frac{u_{x,y+l,z}^t}{\Delta y^2} + \frac{u_{x,y,z+l}^t}{\Delta z^2} \right), \qquad (5)$$

where $u_{x,y,z}^t$ is the value of the pressure field at coordinates x,y,z and time t, and $w_1=w_{-1}$ are spatial finite differencing weights. The spatial finite differencing weights are determined using a series expansion method. The general formula to calculate high order spatial finite differencing weights can be given as the following symbolic expression:

$$\{w_{-n_0/2}, \cdots, w_{-1}, w_0, w_1, \cdots, w_{n_0/2}\} = \qquad (6)$$
$$\text{Coefficients}\left[\text{Series}\left[s^{n/2}\left(\frac{\ln s}{\Delta x}\right)^2, \{\text{on } s, \text{ around } s=1, \text{ to } n\}\right]\right],$$

where n is the order of spatial differentiation and it is an even number, Coefficients[T(s)] is an expression representing the set of coefficients of the polynomial T(s), Series[A,{B,C,D}] is the Taylor series expansion of the expression A of variable B at point C, the expansion being of order D. In expression A, parameter s is defined as $e^{i\omega \Delta x}$.

With the time step chosen in accordance with equation (2), a second order finite time difference is adequate for the time derivatives in equation (4). Thus, the discretized version of equation (4) becomes:

$$u_{x,y,z}^{t+1}=2u_{x,y,z}^{t}-u_{x,y,z}^{t-1}+\Delta t^2 c_{x,y,z}^2((\nabla^2 u_{x,y,z}^t)^n+s_{x,y,z}^t), \quad (7)$$

where $c_{x,y,z}$ is the acoustic velocity value at coordinates x,y,z, and $s_{x,y,z}^t$ is the seismic source signal at coordinates x,y,z and time t. The seismic source signal $s_{x,y,z}^t$ employed for forward propagation may be a recorded or modeled signal from seismic source 112. Alternatively, a simple source wavelet may be employed. For example, an impulse function, a band-limited zero-phase Ricker wavelet, or another type of zero-phase wavelet may be employed.

Equation (7) is used for forward wave propagation. For backward wave propagation (block 716), the discretized equation is:

$$u_{x,y,z}^{t-1}=2u_{x,y,z}^{t}-u_{x,y,z}^{t+1}+\Delta t^2 c_{x,y,z}^2(\nabla^2 u_{x,y,z}^t)^n. \quad (8)$$

In the backward propagation, the received signals are used to set the appropriate pressure field values, unlike forward propagation where the seismic source adds to the appropriate pressure field values.

When performing forward and backward propagation of the (discretized) wave equation, the processors 512 enforce various boundary conditions. To handle surface-related multiple reflections, a free-surface boundary condition is provided at the location of the ocean's surface. The remaining boundaries of the simulation space do not exist in the real world, and accordingly, processors 512 employ "absorbing boundaries" to suppress unwanted reflections from these edges. The absorbing boundary includes padding of the simulation space with space having a taper, causing the extra finite differencing layers to act like an absorbing sponge. The acoustic wave field may follow a cosine taper or an exponential taper, starting at 100% of the wavefield inside the simulation space, and falling to around 60–80%.

Returning to FIG. 7, each processor 512 performs forward propagation of the discretized wave equation in block 714. The source wave field is a time-progression of pressure fields. At regularly-spaced time steps the pressure field is saved for future reference on a local disk or in shared storage 510.

In block 715, each processor 512 sets the time index for backward propagation equal to the last time index from block 714. In block 716, each processor 512 performs backward propagation of the discretized wave equation to generate a receiver wave field. At time steps corresponding to the stored source wave fields, the receiver wave fields may be saved for future reference. Alternatively, the saving of receiver wave fields may be avoided by applying an imaging condition to the receiver wave field and corresponding source wave field as the receiver wave fields are generated.

In block 718, each processor 512 applies an imaging condition to the source and receiver wave fields having corresponding time steps. In some embodiments, the imaging condition is a zero-lagged cross-correlation of the two wave fields that, when integrated over time, yields the following partial image for each common shot gather:

$$P_{x,y,z} = \sum_m \frac{f_{x,y,z}^{mk\Delta t} b_{x,y,z}^{mk\Delta t}}{\sqrt{\sum_x \sum_y \sum_z |f_{x,y,z}^{mk\Delta t}|^2} + \sigma} \quad (9)$$

where $k\Delta t$ is the time step for the saved source wave field (after decimation by k), $f_{x,y,z}^t$ and $b_{x,y,z}^t$ are the pressure field values for the source and receiver wave fields at coordinates x,y,z and time t, and $\sigma$ is a small constant value selected to prevent a vanishing denominator from causing numerical instabilities. Since denominator on the equation (9) compensates for strength of source wavefield, it is considered as "illumination correction". The partial image reveals reflectors wherever the forward and backward propagating wave fields match over time. In block 719, a check is made to see if the time index has reached zero, and if not, each processor 512 returns to block 716.

In block 720, each processor 512 stores the partial image into the appropriate location in an overall survey region, spatially summing the partial image with previously stored values wherever an overlap exists. During the seismic survey, the seismic source is repeatedly fired as the ship (and receiver array) moves forward. The spatial source ignition interval is designed to provide a large overlap between successive shot gathers, enabling each portion of the overall survey region to be determined from multiple partial images.

In block 722, each processor 512 determines whether additional tasks (e.g., shot gathers) have been allocated to that processor. If additional tasks exist, then blocks 712–722 are repeated. Otherwise the process completes. Once each of the processors have finished, the shared storage units 510 will contain a three-dimensional image of the overall survey region.

As previously mentioned the processing for a given shot gather is preferably allocated to a single processor to minimize cross-communication between processors. However, for tasks where the memory requirements exceed the memory capacity of a single processor, domain decomposition may be employed to distribute the computing task among multiple processors. Such a division of labor, even with its concomitant requirements for inter-processor communications, is to be preferred over the I/O delays that would result from exceeding the memory capacity of a single processor. Domain decomposition techniques work particularly well for the discretized wave equations described herein, although some added overhead is to be expected (around 10–15% of the total computational cost).

In some embodiments, the domain decomposition is performed by region. That is, each processor 512 is allocated a portion of the wave field volume for propagation and imaging. At each time step, each processor sends and receives pressure field values for a layer along the boundaries with regions handled by other processors. The thickness of the layer is n/2, which is half the width of the spatial differencing filter.

The following calculations are an example of determining the memory requirements for processing of a shot gather. The memory requirements for one time step of the source or receiver wave field is:

$$N_b = N_x N_y N_z \text{ size of (floating point number)} \quad (10)$$

where $$N_x = \frac{\frac{L}{2}+2a}{\Delta x} + 2\left(N_{xp}+\frac{n}{2}\right) \quad (10a)$$

$$N_y = \frac{\frac{W}{2}+2a}{\Delta y} + 2\left(N_{yp}+\frac{n}{2}\right) \quad (10b)$$

$$N_z = \frac{D}{\Delta z} + 2\left(N_{zp}+\frac{n}{2}\right) \quad (10c)$$

with L being the length of the receiver array, W being the width of the receiver array, D being the maximum depth to be imaged, a being an aperture size to reduce edge effects, n being the spatial filter order, and $N_{xp}$, $N_{yp}$, $N_{zp}$ being the padding layer thickness for absorption on the x, y, and z boundaries. As an example, the padding layer thickness may vary from 10 to 25 grid points. The memory requirements for one time step may be about 0.5 gigabytes for a 6 km aperture, 12 km survey depth, and 25 meter spatial grid spacing.

Because multiple time steps are needed and a partial image is being constructed, the total memory requirements for propagation and imaging may be about 2 gigabytes in this example. Shared storage space is significantly larger due to the saving of the many time steps of the source wave field. Assuming 2 millisecond time steps, and a decimation factor between 10 and 50, the total shared storage space per processor may be about 60–150 gigabytes.

The invention disclosed herein provides an improvement over one-way wave equation based methods in its ability to cope with highly dipping events, turning waves, and multiples. In preferred embodiments, the invention utilizes a discretized wave equation that supports wave propagation in two directions while maintaining computational feasibility. The use of spatial finite difference filters also permit domain decomposition, enabling larger imaging jobs to be performed efficiently by multiple processor computers. A cross-correlation with the illumination compensation based imaging condition offers improved imaging through the incorporation of energy from multiple reflections.

Numerous variations and modifications will become apparent to those skilled in the art once the above disclosure is fully appreciated. It is intended that the following claims be interpreted to embrace all such variations and modifications.

What is claimed is:

1. A pre-stack imaging system that comprises:
   multiple processors each configured to:
   perform two-way wave equation-based forward wave propagation of a source event to obtain a source wave field using high order spatial finite differences for a shot gather;
   perform two-way wave equation-based backward wave propagation of received waves to obtain a receiver wave field using high order spatial finite differences for the shot gather; and
   correlate the source and receiver wave fields to obtain an image region.

2. The system of claim 1, further comprising:
   one or more shared storage devices coupled to the multiple processors and cooperatively configured to store a plurality of shot gathers, a velocity cube, a plurality of source wave fields, and an image region.

3. The system of claim 2, wherein the stored source wave fields are time-wise decimated.

4. The system of claim 1, wherein the forward and backward propagation are performed using a high-order spatial finite differencing filter to estimate the Laplacian, the spatial filter having an order greater than two.

5. The system of claim 4, wherein the spatial filter has an order greater than six.

6. The system of claim 4, wherein the spatial filter has coefficients determined using a series expansion to approximate the Laplacian.

7. The system of claim 1, wherein the forward and backward propagation are performed using a time step that is determined using a spatial grid spacing, a maximum acoustic velocity, and the coefficients of the spatial filter.

8. The system of claim 1, wherein the forward and backward propagation are performed using a time step that is determined using a spatial grid spacing and a maximum acoustic velocity.

9. The system of claim 1, wherein each of the multiple processors is further configured to exchange boundary values of the source and receiver wave fields with at least one other processor operating on the same wave field.

10. The system of claim 1, wherein each of the multiple processors is further configured to contribute the image region to an overall survey image by stacking the image region with any overlapping image regions determined by other processors.

11. A pre-stack imaging method that comprises:
    obtaining multiple shot gathers for a survey region;
    obtaining a velocity cube for the survey region;
    determining a propagation time step;
    allocating each shot gather to at least one processor, said at least one processor:
      performing forward propagation of a source wavelet using a discretized high order spatial finite difference wave function to obtain a source wave field for the shot gather;
      performing backward propagation of received waves using a discretized high order spatial finite difference wave function to obtain a receiver wave field for the shot gather; and
      correlating the source and receiver wave fields to form a partial image;
    and displaying said partial image.

12. The method of claim 11, further comprising:
    said at least one processor stacking the partial image with overlapping partial images to form a portion of an overall survey image.

13. The method of claim 11, wherein each shot gather is allocated to a single processor.

14. The method of claim 11, wherein each shot gather is allocated to multiple processors, each of the multiple processors exchanging layers of wave field boundary values at each time step to enable computation of near-boundary values for a subsequent time step.

15. The method of claim 11, wherein the forward and backward propagation are performed using a high order spatial finite differencing filter to estimate a Laplacian, the spatial filter having an order greater than two.

16. The method of claim 15, wherein the spatial filter has coefficients determined using a series expansion approximation of the Laplacian.

17. The method of claim 16, wherein the propagation time step is determined using a spatial grid spacing, a maximum acoustic velocity, and the coefficients of the spatial filter.

18. The method of claim 11, wherein said combining is a zero-lag cross-correlation of the source and receiver wave fields, normalized by an energy of the source wave field.

19. The method of claim 11, wherein said performing forward propagation includes saving evenly time-spaced versions of the source wave field.

* * * * *